Aug. 30, 1955
E. F. PENNA
2,716,286
MEASURING GAGE FOR LINOTYPE SLUGS
Filed Aug. 14, 1951
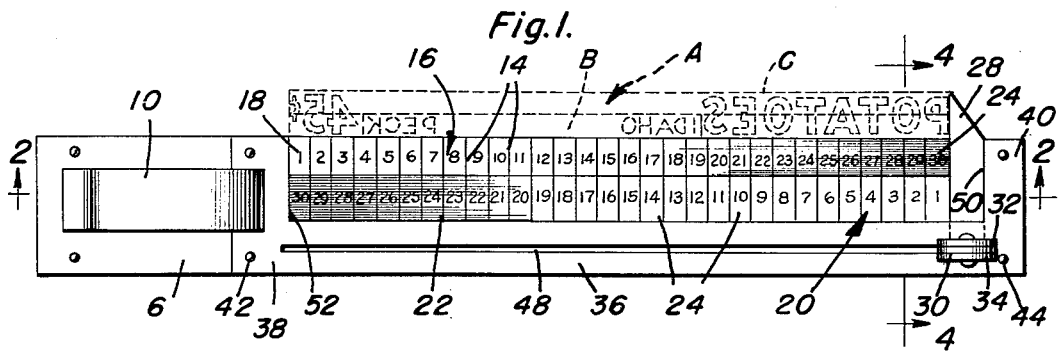
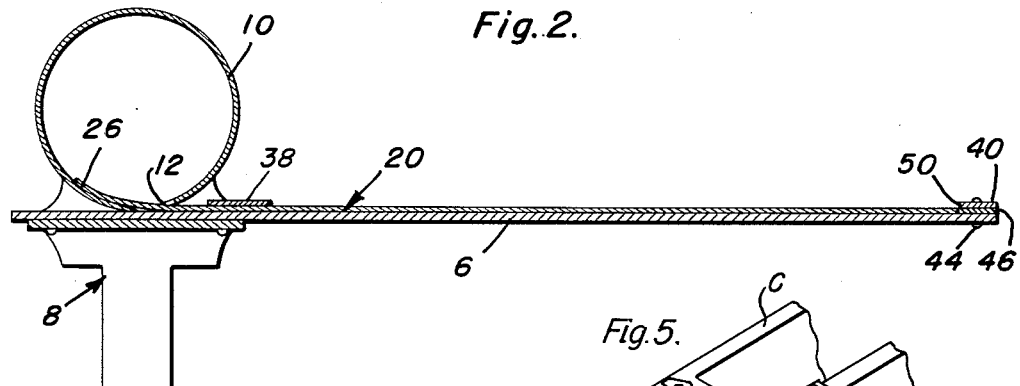
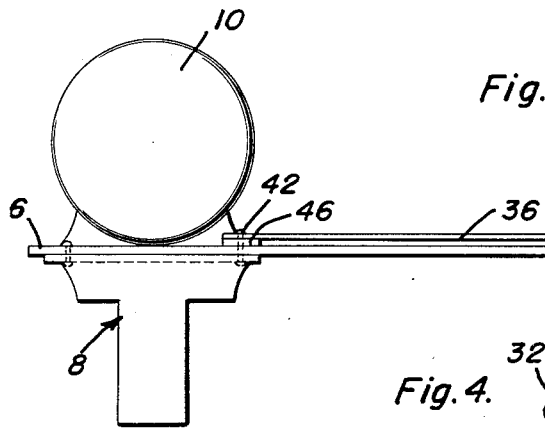
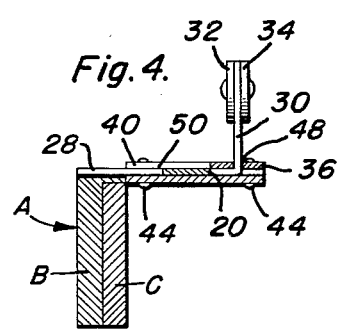
Ernest F. Penna
INVENTOR.

United States Patent Office 2,716,286
Patented Aug. 30, 1955

2,716,286

MEASURING GAGE FOR LINOTYPE SLUGS

Ernest F. Penna, Holland, Mich.

Application August 14, 1951, Serial No. 241,715

2 Claims. (Cl. 33—174)

The present invention relates to certain new and useful improvements in variable measuring gages and has more particular reference to a gage which is expressly, but not necessarily, adapted to be fixed on a Linotype or Intertype machine at a point of vantage for the operator, particularly where the finished but still hot slugs are delivered, said gage being useful in that it makes it convenient and possible for an operator to measure and determine the amount of quadding space needed atop an underbuilding slug to accommodate the projecting or overhanging letter or letters on a primary or previously cast complemental slug.

It is generally well accepted that Linotype slug gaging and measuring requirements are often determined by the operator by lifting the slug and matching and determining the requirements of the given example by hand. Another technique currently used is for the operator to pick up a line gage and place it on the slug to find the desired measuring needs.

It is an object of the instant invention to structurally, functionally and otherwise improve upon prior art measuring gages by providing one whose unique and reliable facilities serve to instantly show the user the number of quads required under any words or letters on the underbuilding slugs in proper relation to an overhanging letter, or letters, on a previously cast slug.

More specifically, the invention has to do with a simple, efficient and economical measuring gage used for slugs with overhanging letters and which involves the use of two or more slugs and which is characterized by fixed and movable companion scales having duplicate graduations, the graduations on the fixed scale being consecutively numbered from left to right and the graduations on the movable scale being consecutively numbered in reverse, that is, in a direction from right to left.

Further novelty is predicated on the foregoing construction wherein the two scales are incorporated in a base having an adapter means for securing the base on the Linotype machine at the juncture of the chute and galley, the movable scale being a flexible steel measuring tape having a finger-piece and indicator finger at one end with the opposite end of said tape arranged to conveniently coil itself for out-of-the way storage in a casing mounted on one end of said base.

Other objects and advantages will become more apparent from the following description and the accompanying sheet of illustrative drawings.

In the drawings:

Figure 1 is a top plan view of a special measuring gage constructed in accordance with the principles of the present invention and showing the manner in which the same is used in association with two finished slugs;

Figure 2 is a longitudinal section taken on the plane of the line 2—2 of Figure 1 looking in the direction of the arrows;

Fig. 3 is an edge elevation of the gage; and,

Figure 4 is a cross-section on the line 4—4 of Figure 1, looking in the direction of the arrows and showing the two side-by-side primary and secondary (underbuilding) slugs in full lines.

Figure 5 is an exploded perspective view of the aforementioned slugs, the primary one with the overhanging letter or letters and the secondary one, hereinafter referred to as an underbuilding slug, presented here to facilitate an understanding of the mode of use of the invention.

In carrying out the principles of this invention, as will be later clarified, I provide a measuring instrument or gage which is such in construction that it may be fixed to the Linotype machine in a manner and position to greatly speed up production by enabling the operator to take measurements, such as are required, in preparing progressively cast two or more slugs for printing purposes. To this end, the gage is secured to the Linotype machine in a position which enables the operator to get certain measurements without touching or lifting the slugs from the point of delivery, which accomplishment, it is believed, has not been available in similarly constructed fixed and movable scale adaptations.

Referring now to the drawings by reference numerals and accompanying lead lines the base means takes the form of a rectangular rigid base plate which is denoted by the numeral 6. At one end this is provided with a fixedly attached U-shaped adapter bracket 8 which makes it possible to conveniently anchor the base plate on the Linotype or Intertype machine at the point where the finished slugs are delivered (not shown). At this same end there is a circular casing 10 having opening means 12 in its bottom in close proximity to the adjacent surface of the base and which serves in a manner to be hereinafter described. As best shown in Figure 1, one longitudinal straight-edge portion of the base plate is provided with uniformly spaced transverse lines or graduations 14 which collectively go to make up a relatively stationary measuring scale 16. It will be noticed that the graduations or spaces between the same are numbered or calibrated and the numbers 18 range from 1 to 30 and run, left to right, in the consecutive order revealed. The relatively movable scale is denoted by the numeral 20 and this ranges lengthwise along the stationary scale and is superimposed upon and slidably mounted on the base plate almost wholly within the marginal limits of said base plate. Here again the movable scale has spaced graduations denoted by the numerals 22 and these have consecutive numbers or scale markings 24 which also run from 1 to 30 but are in reverse order, that is, range from right to left as shown in Figure 1. The movable scale is therefore of a corresponding length with the fixed or stationary scale and the two may have their respective calibrations or graduations lined up orderly as shown in Figure 1. Referring to Figure 2 it will be seen that the movable scale is preferably a length of coilable steel tape, the kind used, for example, by surveyors and others. It will be noticed also, that the left hand end of the tape is free as at 26 and registers with and extends through the opening means 12 and coils itself in the casing when the movable scale is moved from the extreme or extended position to the right as shown in Figure 1 to any position ranging from right to left. If the movable scale is slid toward the left from the position shown in Figures 1 and 2 the free end portion will obviously coil and thus store itself in the casing 10. It also follows that one end portion of the flexible movable scale is partly anchored in its desired position through the medium of the casing. The opposite end is provided with a simple L-shaped bracket. The bracket is permanently joined or otherwise secured to the right hand end of the scale and one limb extends and provides a horizontal indicator finger 28. The other arm provides an upstanding finger-piece 30 and the latter is provided with buttons 32 and 34 which when properly located and riveted in place provide convenient handling means for the finger-piece.

A masking frame or flat plate of general U-shaped form is provided and this has an elongated central portion 36 and lateral end portions 38 and 40. This frame is superimposed on the base and has its end portions riveted securely to the base plate as at the points 42 and 44 respectively. The end portion 38 serves in holding the movable scale in place. If desired, spacing shims 46—46 (see Figure 3) may be provided to afford the desired spacing for the aforementioned L-shaped bracket, that is, the part which includes the indicating finger 28 and the finger-piece 30. Not only this, the portion 36 is provided with an elongated guide and assembling slot 48 through which the finger 30 extends and slides back and forth, in an obvious fashion.

Further in connection with the frame means just referred to it will be seen that the end portion 40 provides a shoulder or abutment 50 which checks the right hand sliding motion of the indicator finger 28, as shown in Figure 1. The portion 38 provides another similar shoulder but this is primarily a stationary index 52 for the two scales as well as the indicator finger 28. In certain printing jobs, it is desirable to have certain letters or words boldly displayed larger than others on the same line, and therefore, because, of the present mechanical method of doing this, it is necessary to determine and resort to the use of certain measurements. All Linotype slugs are cast in molds having a height of .875". The letters or mats are held against this mold during the casting and with the addition of the letters a height of .918" is obtained; but the thickness of the molds does vary according to the needs of the type or space available in an advertisement or other printed matter.

As a consequence of the variety of thicknesses available for casting type from various molds, I cite this example:

A problem may involve casting some 24 point (printer's measure) letters on an 8 point thickness slug along with some 8 point letters. Hence, a simple subtraction will show that you have 16 points left from the 24 point letters which are not bracingly supported by the .875" underbuilding or foundational slug or slugs.

This foundation or underbuild is obtained by casting one or more slugs, as required, of a material which will give the necessary .875" foundation to the remaining 16 points to give the over-all the necessary .918" height.

Since it is possible to cast the 24 point letters, as per above example, anywhere on the 8 point slug or to use enough 24 point letters to make one or more words and possibly a price at two different positions on the 8 point slug, it is absolutely necessary that the two scales be used—one a fixed scale and the other movable, because at the point of delivery on the Linotype machine, the one end of the slug stops at a fixed point, but the other end may be at any point within the capabilities of the Linotype machine. As a consequence, my gage without the use of the fixed scale, reading from left to right, and movable scale, reading from right to left, would immediately lose its merit or my purpose of inventing it. The Linotype operator would again have to use a hand gage which he must pick up each time and also endanger himself by handling the hot slug to obtain all the required facts or measurements.

The only effort required of an operator using my gage is to simply move the slidable scale to the same measurements of slug length he is using for a given piece of work on the Linotype machine. The gage will immediately reveal any possible measurement requirements he will be forced to use to complete his work.

Before proceeding further, it is to be pointed out specifically that there are but two complemental slugs herein denoted, and the assembly is designated generally or broadly by the letter A. The components are denoted at B and C. C denotes a primary slug with the overhanging letters on the top edge, that is, with the right hand end portions of the letters (see Figure 4) projecting and overlying the upper edge of the secondary slug B, which is specifically referred to as the underbuilding or foundational slug. Figure 5 brings out with particularity the construction of these slugs B and C which go to make up the over-all or two-part ready-to-use slug A.

In practice the attachment, that is the over-all measuring gage, is fixed in place by way of the adapter means 8. As previously mentioned it had to be best located at a point where the finished slugs are delivered by the Linotype or Intertype machines.

The objective of the invention, as will now be clear, is to provide a means for determining measurements of slugs for various lengths of lines wherein scales or gages integral with the machine are provided for direct reading of information required to determine varying quadding and spaces on a foundational underbuilding slug for overhanging letter portions on a precast complemental primary slug.

It is desirable, if not virtually necessary, to be able to measure from the stationary end which is shown as the left end of the gage and which constitutes the base for all slugs delivered from the machine immediately after being cast. Other dimensions must be measured from the right hand side of slug which, as is apparent, may vary in length. The slidable scale or gage 20 is, as described, provided with the stated outstanding indicating finger 28 and an adjusting handle 30 to permit the operator to move said slidable scale, placing pointer or finger at the right hand end of slug, thus permitting direct reading of length required for foundation of overhanging type. For quick accurate reading the stationary scale reads from left to right and the movable scale from right to left.

To fully comprehend and appreciate the unique and distinctive characteristics of this gage, one must call to mind and picture present operations to accomplish the same result.

First, it is necessary to pick up the hot slug (a primary slug with overhanging letters) with left hand and simultaneously pick up a hand scale in the other hand and then, measure from left and right hand ends of slug to determine the desired quadding space measurements sought. After measurements have thus been determined, the slug must be replaced into a rack in the same position from which it has been removed and then the operator (who has had to remember the readings of the scale measurements) must operate the machine and produce a second foundational or so-called underbuilding slug.

With the use of this new compact direct reading gage the operator is relieved of picking up the hot slug and also the measuring scales which enables him to accomplish the work at hand in a much shorter time while eliminating much useless movement and handling of the parts involved.

All that is necessary is for the operator to set the movable scale pointer to the right hand end of the slug and while confining operations to this length of slug no further change of gage setting will be required. This provides the direct reading from either the right or left hand end of slug. With but little effort, a change of setting for longer or shorter slugs can be accomplished.

It will be appreciated that with the invention hereinunder advisement in use and at the convenient disposal of the user, encountering burned hands and fingers while handling slugs which are still hot will be reduced to a minimum. The fact that it is not necessary, as under the old procedure, to use both hand, the operator may remain conveniently at the keyboard of the machine with a saving of time and labor. By eliminating the customarily employed steps of removing, replacing and otherwise handling slugs, the time during which memory is depended upon in retaining the readings is appreciably reduced, thereby reducing errors to a practical minimum. While the indicia revealed herein employs 12 points to the em or quad, any other practical system of graduating, numbering and measuring may, of course, be adopted.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

1. For use on a Linotype machine at a point where slugs are delivered while still hot, a measuring gage the use of which makes it possible for an operator to accurately measure and determine at a glance the quads and predetermined spaces needed atop an underbuilding slug for stabilizing support of any overhanging letter or combination of letters on a precast primary complemental slug comprising a rigid linearly straight base having adapter means at one end for attachment to and retention upon a given part of the Linotype machine, said base having a lengthwise straight edge having consecutively numbered graduations forming a stationary scale, plate means superimposed upon the graduated surface of said base, said plate means being spaced above said surface and providing a shoulder at one end of said base and said shoulder constituting an index for said stationary scale, said plate means also providing a stop shoulder at the opposite end of said base, a flexible scale slidably superimposed on said base, and having consecutively numbered graduations cooperating with the graduations embodied on said stationary scale, an indicating finger fixed to one end of the flexible scale and coplanar therewith and slidably contacting said base and cooperating with and projecting outwardly and beyond said straight edge, said indicating finger being provided with an upstanding angularly disposed finger piece, and said finger piece being slidably engaged with and interposed between said plate means and base to facilitate actuating said flexible scale, the opposite end of said flexible scale being free, a casing mounted on one end of said base and having a slot in close proximity to an adjacent surface of the base, the free end portion of said flexible scale passing through said slot and being adapted to coil itself within the confines of said casing under certain measuring conditions.

2. For use on a Linotype machine at a point where finished slugs are delivered while still hot, a measuring gage the use of which makes it possible for an operator to accurately measure and determine at a glance the quads and predetermined spaces needed atop an underbuilding slug for stabilizing support of any overhanging letter or combination of letters on a precast primary complemental slug comprising a rigid linearly straight base having adapter means at one end for attachment to and retention upon a given part of the Linotype machine, said base having a lengthwise straight edge having consecutively numbered graduations forming a stationary scale, plate means superimposed upon the graduated surface of said base, said plate means being spaced above said surface and providing a shoulder at one end of said base and said shoulder constituting an index for said stationary scale, said plate means also providing a stop shoulder at the opposite end of said base, a flexible scale slidably superimposed on said base, and having consecutively numbered graduations cooperating with the graduations embodied on said stationary scale, an indicating finger fixed to one end of the flexible scale and coplanar therewith and slidably contacting said base and cooperating with and projecting outwardly and beyond said straight edge, said indicating finger being provided with an upstanding angularly disposed finger piece, and said finger piece being slidably engaged with and interposed between said plate means and base to facilitate actuating said flexible scale, the opposite end of said flexible scale being free and slidably mounted and movable in the space between said base and overlying end portions of said plate means.

References Cited in the file of this patent

UNITED STATES PATENTS

| Number | Name | Date |
|---|---|---|
| 144,264 | Discher | Nov. 4, 1873 |
| 491,733 | Foster | Feb. 14, 1893 |
| 675,785 | Muller | June 4, 1901 |
| 876,696 | Dauner et al. | Jan. 14, 1908 |
| 1,125,155 | Nunn | Jan. 19, 1915 |
| 1,253,536 | Conner | Mar. 5, 1918 |
| 1,623,359 | Rauworth | Apr. 5, 1927 |
| 2,256,116 | Hughes | Sept. 16, 1941 |
| 2,458,344 | Carrol | Jan. 4, 1949 |
| 2,498,397 | Daly | Feb. 21, 1950 |
| 2,567,262 | Wilims | Sept. 11, 1951 |

FOREIGN PATENTS

| Number | Country | Date |
|---|---|---|
| 38,557 | Norway | Dec. 10, 1923 |

OTHER REFERENCES

Fineberg, Abstract of App. Ser. No. 570,425, published Nov. 28, 1950.